(12) United States Patent
Lin

(10) Patent No.: US 6,434,443 B1
(45) Date of Patent: Aug. 13, 2002

(54) METHOD FOR PERFORMING DYNAMIC RE-SCHEDULING OF FABRICATION PLANT

(75) Inventor: Kuo-Chen Lin, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 09/313,304

(22) Filed: May 17, 1999

(51) Int. Cl.[7] .............................................. G06F 19/00
(52) U.S. Cl. ...................... 700/100; 700/101; 700/121
(58) Field of Search ..................... 700/97, 105, 99–102, 700/121; 705/7–9

(56) References Cited

U.S. PATENT DOCUMENTS

| 5,546,326 | A | | 8/1996 | Tai et al. ..................... 364/552 |
| 5,612,886 | A | | 3/1997 | Weng ..................... 364/468.07 |
| 6,088,626 | A | * | 7/2000 | Lilly et al. ................... 700/100 |

OTHER PUBLICATIONS

Liu et al., "A Methodology for Improving On–Time Delivery and Load Leveling Starts," IEEE/Semi Advanced Semiconductor Manufacturing Conference, pp. 95–100 (1995).
Murty et al., "Global Planning at Harris Semiconductor, 1995 International Symposium on Semiconductor Manufacturing", pp. 18–23.
Hoitomt et al., "Scheduling a Batch Processing Facility", Proceedings of the 1992 IEEE International Conference of Robotics and Automation, Nice France, (1992) pp. 1167–1172.

* cited by examiner

Primary Examiner—Leo P. Picard
Assistant Examiner—Steven R. Garland
(74) Attorney, Agent, or Firm—George O. Saile; Stephen B Ackerman; Graham S. Jones

(57) ABSTRACT

A method/system for performing dynamic re-scheduling of priorities of work-in-process in a fabrication plant for manufacturing of a product is provided. It reads a key stage report for the work-in-process and a master production schedule for the work-in-process from stored data. It generates a master production schedule report from the key stage report and the master production schedule following only Due__Date data for the work-in-process, and generates a work-in-process distribution matrix for integrating the master production schedule report with work-in-process quantity data within a deliverable cycle time; allocates selected lots from the work-in-process distribution matrix using a snake pattern method to allocate the selected lots from the matrix, and changes the due date for the selected lots of the work-in-process selected by the snake pattern method. It generates a final re-scheduling table for the work-in-process including the selected lots.

24 Claims, 5 Drawing Sheets

| 21 | 22 | 23 | | | | | | | |
|---|---|---|---|---|---|---|---|---|---|
| Key Stage Report (KSR) ||||||||||
| Product | Stage1 | Stage2 | Stage3 | ............. ||||| QC-INSP ← 27 |
| A | W1 | W2 | W3 | S4a | S5a | S3a | S1a | S2a | WA ← 28 |
| B |  |  |  | S3b | S2b | S1b | S5b | S4b | WB ← 29 |
|  | 24 | 25 | 26 | | | | | | ↖ 20 |

FIG. 4

| Master Production Schedule (MPS) |||||||
|---|---|---|---|---|---|---|
| PRODUCT | Date1 | Date2 | Date3 | Date4 | Date5 | ..... Date31 ← 32 |
| A | S1a | S2a | S3a | S4a | S5a |  ← 33A |
| B | S1b | S2b | S3b | S4b | S5b |  ← 33B |
|  |  |  |  |  |  | ↖ 31 |

FIG. 5

| Master Production Schedule Report (MPSR) |||||||
|---|---|---|---|---|---|---|
| PRODUCT | Date1 | Date2 | Date3 | Date4 | Date5 | ..... Date31 |
| A | S2a | S1a | S3a | S5a | S4a |  ← 36 |
| B | S4b | S5b | S1b | S2b | S3b |  ← 37 |
|  |  |  |  |  |  | ↖ 35 |

FIG. 6

| WAFER QUANTITY WITHIN DELIVERABLE COUNT (CT) | MASTER PRODUCTION SCHEDULE REPORT (MPSR) WORK IN PROCESS DISTRIBUTION MATRIX | | | | | |
|---|---|---|---|---|---|---|
| | Date1 | Date2 | Date3 | Date4 | Date5 | ...Date31 |
| CT1 | S2a1 | S1a1 | S4a1 | S4a2 | S2b2 | |
| CT2 | S4b1 | S2a2 | S1a2 | S1b1 | S2b1 | |
| CT3 | S4b2 | S5b1 | S5b2 | S3a2 | S3b2 | |
| CT4 | S1b2 | S3b1 | S3a1 | S5a1 | S5a2 | |
| ⋮ | | | | | | |
| CT31 | | | | | | |

*FIG. 7*

WIP-SNAKE PATTERN SELECTION

| | P1 | P2 | | | |
|---|---|---|---|---|---|
| CT1 | S2a1 | S1a1 | S4a1 | S4a2 | S2b2 |
| CT2 | S4b1 | S2a2 | S1a2 | S1b1 | S2b1 |
| CT3 | S4b2 | S5b1 | S5b2 | S3a2 | S3b2 |
| CT4 | S1b2 | S3b1 | S3a1 | S5a1 | S5a2 |

*FIG. 8*

| New Master Production Schedule (NMPS) | | | | | | |
|---|---|---|---|---|---|---|
| PRODUCT | Date1 | Date2 | Date3 | Date4 | Date5 | .....Date31 |
| A | Ra1 | Ra2 | Ra3 | Ra4 | Ra5 | |
| B | Rb1 | Rb2 | Rb3 | Rb4 | Rb5 | |

*FIG. 9*

METHOD FOR PERFORMING DYNAMIC RE-SCHEDULING OF FABRICATION PLANT

BACKGROUND OF THE INVENTION

1. Field of the Invention

This invention relates to dynamic scheduling of workflow for a manufacturing plant and more particularly to optimizing the automation of scheduling of work in a plant processing a product such as semiconductor wafers.

2. Description of Related Art

Liu, C.; Thongmee, S.; and Hepburn, P. "A Methodology for Improving On-Time Delivery and Load Leveling Starts" 1995 IEEE/Semi Advanced Semiconductor Manufacturing Conference, pp. 95–100 (1995) describes methods for simulation-based production scheduling and planning of Work-In-Process (WIP).

Murty, S. V.; Bienvenu, J. W. "Global Planning at Harris Semiconductor" 1995 International Symposium on Semiconductor Manufacturing, pp. 18–23 (1995) describes a requirements planning system for a semiconductor specific planning engine that scans the entire production pipeline.

Hoitomt, D. J.; Luh, P. B. "Scheduling a Batch Processing Facility" Proceedings of the 1992 IEEE International Conference of Robotics and Automation" Nice France, (1992) pp 1167–1172 describes scheduling in a batch processing facility such as a "heat treat oven" for processing non-identical parts concurrently (batch composition) and determining beginning times for individual batches (batch sequencing). In some cases, composition is determined by assigning parts to batches according to Earliest Due Date (EDD). It states that the solution to the Lagrangian relaxation dual problem is a lower bound on the cost of the optimal schedule; and if assumptions are relaxed the EDD rule becomes a heuristic for solving the batch composition problem and the same batch sequencing algorithm can be used for making a schedule. It was to be used for improving delivery times where bottlenecks exist in batch processing facilities.

U.S. Pat. No. 5,612,886 of Weng for "Method and System for Dynamic Dispatching in Semiconductor Manufacturing Plants" shows a method for dynamic dispatching in semiconductor plants.

U.S. Pat. No. 5,546,326 of Tai et al. for "Dynamic Dispatching Rule that Uses Long Term Due Date and Short Term Queue Time to Improve Delivery Performance" discloses a dynamic dispatching rule.

SUMMARY OF THE INVENTION

It is an object of this invention to provide a method for changing the Due_Date (DD) of Work-In-Process (WIP) while at the same time assuring that the flow rate of the production line (wafer output) is linear. Product Control (PC) only uses the Required_Date (RD) based on manufacturing experience (e.g. a target of 2 days/lot (L)) to make a proper, but not exactly rational linear wafer start.

Another object of this invention is to provide a method for performing the task of re-scheduling and follow only the Product Control (PC) original of the customer driven Master Production Schedule (MPS).

Still another object of this invention to transform the linear wafers start into linear wafer output performance to ensure customer's satisfaction on volume demanding.

A further object of this invention is to ensure the inline equipment in loading balance.

One more object of this invention is to meet the daily linear wafers output by demand (Designed Out) in conformance with the on time delivery orientation of customers.

In accordance with one aspect of this invention, a system and a method are provided for transforming a set of Linear Wafers Starts (LWS) into a set of Linear Wafers Out (LWO) to ensure customer satisfaction by meeting the product quantity (volume) demands made by customers.

In accordance with another aspect of this invention a system and a method are provided for ensuring balance of loading of inline equipment.

In accordance with another aspect of this invention a system and a method are provided for meeting the daily demand (Designed Out) Linear Wafers Out (LWO) by the on time delivery orientation of customers.

In accordance with this invention use is made of the Due_Date, the link with products, and theoretical process time to make an exact re-scheduling automatically to ensure a linear wafer output.

In accordance with this invention a method and/or system for performing dynamic re-scheduling of priorities of work-in-process in a fabrication plant for manufacturing of a product is provided. It reads a key stage report for the work-in-process and a master production schedule for the work-in-process from stored data. It generates a master production schedule report from the key stage report and the master production schedule following only Due_Date data for the work-in-process, and generates a work-in-process distribution matrix for integrating the master production schedule report with work-in-process quantity data within a deliverable cycle time; allocates selected lots from the work-in-process distribution matrix using a snake pattern method to allocate the selected lots from the matrix, and changes the due date for the selected lots of the work-in-process selected by the snake pattern method. It generates a final re-scheduling table for the work-in-process including the selected lots, where $$\sum_{X=1,Y=1}^{X=n,Y=3} MPSR(\text{Due\_Date}\ (X), CT(Y)) = \text{Designed Out}$$

CT=Cycle Time
X=1, 2, 3 . . . m
Y=1, 2, 3 . . . p where m and p are positive integers, It uses the Due_Date data in allocating the selected lots. The method/system uses a link with products in allocating the selected lots and uses theoretical process time to make an exact re-scheduling automatically to ensure linear wafer output performance in allocating the selected lots when forming the master production schedule fitting work-in-process in the key stage report to meet requirements of the master production schedule.

GLOSSARY

| | |
|---|---|
| Cycle Time | (CT)) Time to go from beginning to end of FAB. |
| Due_Date | (DD) Scheduled Due Date from MPS, i.e. the date when processing of a lot must be finished for an order placed on the MPS. |
| FAB | Fabrication plant. |
| MPS | Master Production Schedule. |

| GLOSSARY | |
|---|---|
| Required_Date (RD) | Date when lot must be finished out according to the start date and the average cycle time data of the past. |
| WIP | Work in Process. |

BRIEF DESCRIPTION OF THE DRAWINGS

The foregoing and other aspects and advantages of this invention are explained and described below with reference to the accompanying drawings, in which:

FIG. 4 is a chart showing a portion of a KSR (Key Stage Report) which is a report on the process flow of the fabrication plant (FAB).

FIG. 5 is a chart showing a portion of a MPS (Master Production Schedule) which is a customer driven table reflecting the schedule demands of customers.

FIG. 6 is a chart showing a portion of a MPSR (Master Production Schedule Report) which integrates the customer driven MPS table and the KSR.

FIG. 7 is a chart showing an example of a Work in Process (WIP) MPSR matrix.

FIG. 8 is a chart showing an enlarged portion of the chart of FIG. 7 with wafers selected from the MPSR matrix shown in FIG. 7 by scanning adjacent columns of wafers with snake patterns.

FIG. 9 shows the resultant New Master Production Schedule (NMPS) produced by the system and method of this invention.

DESCRIPTION OF THE PREFERRED EMBODIMENT

This is a method for performing dynamic re-scheduling of a fabrication plant. This method defines the due date of a lot Ln (where n is a positive integer) without changing the required date of the lot Ln whose due date is being defined.

Generate a Master Production Schedule Report

Figure 1:
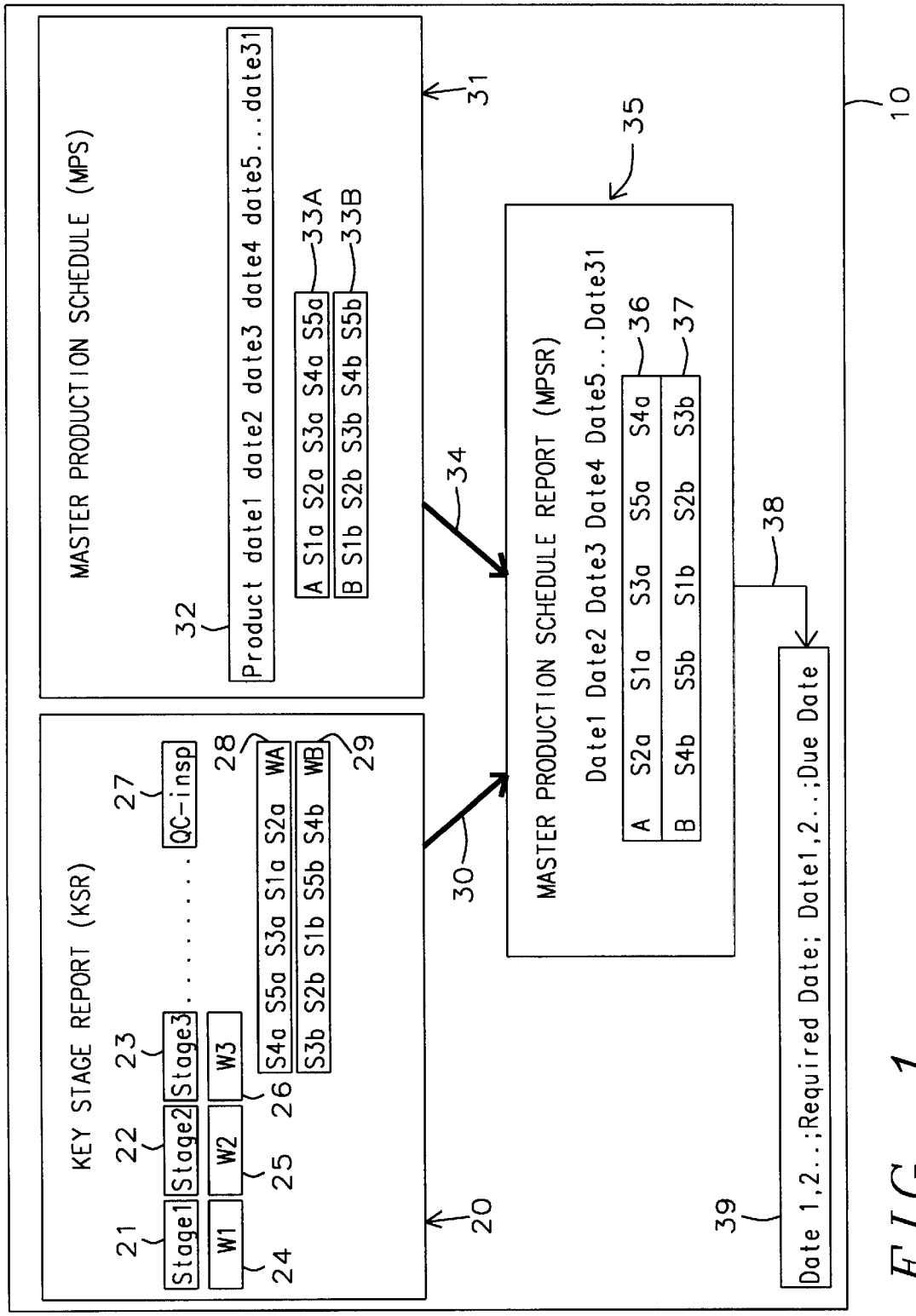
FIG. 1 is a chart which shows how data is combined to generate a Master Production Schedule Report (MPSR) through integration of a Key Stage Report (KSR) and a Master Production Schedule (MPS).

FIG. 1 is a chart which shows how data is combined to generate a Master Production Schedule Report (MPSR) 35 through integration of a Key Stage Report (KSR) 20 and a Master Production Schedule (MPS) 31 and without concern about the Required_Date (RD), but by following only the Due_Date (DD) data. Note that the Master Production Schedule (MPS) is shown also in FIG. 5.

Figure 2:
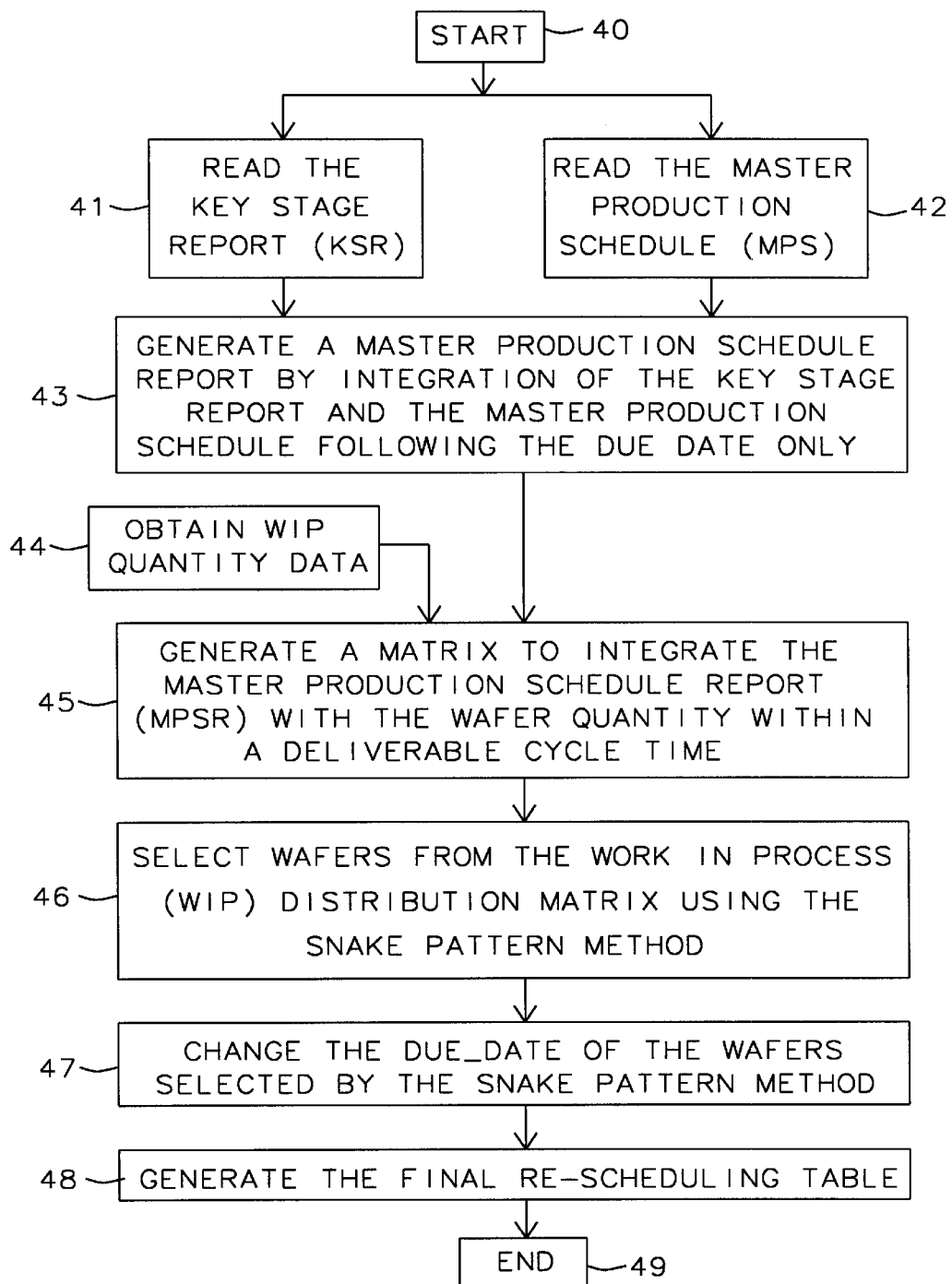
FIG. 2 is a flow chart of a computer program showing the steps of a method of operation of a production control system in accordance with the method and system of this invention.

FIG. 2 is a flow chart of a computer program showing the steps of a method of operation of a production control system in accordance with the method and system of this invention. The flow chart starts with step 40 in FIG. 2. Next step 41 causes the system to read the KSR report 20 (shown in FIG. 1 and FIG. 4) in FIG. 2. Simultaneously step 42 causes the system to read the MPS 31 (shown in FIG. 1 and FIG. 5). Steps 41 and 42 lead to step 43 in FIG. 2 which causes the system to generate the Master Production Schedule Report (MPSR) 35 (shown in FIG. 1 and FIG. 6).

System Configuration

Figure 3:
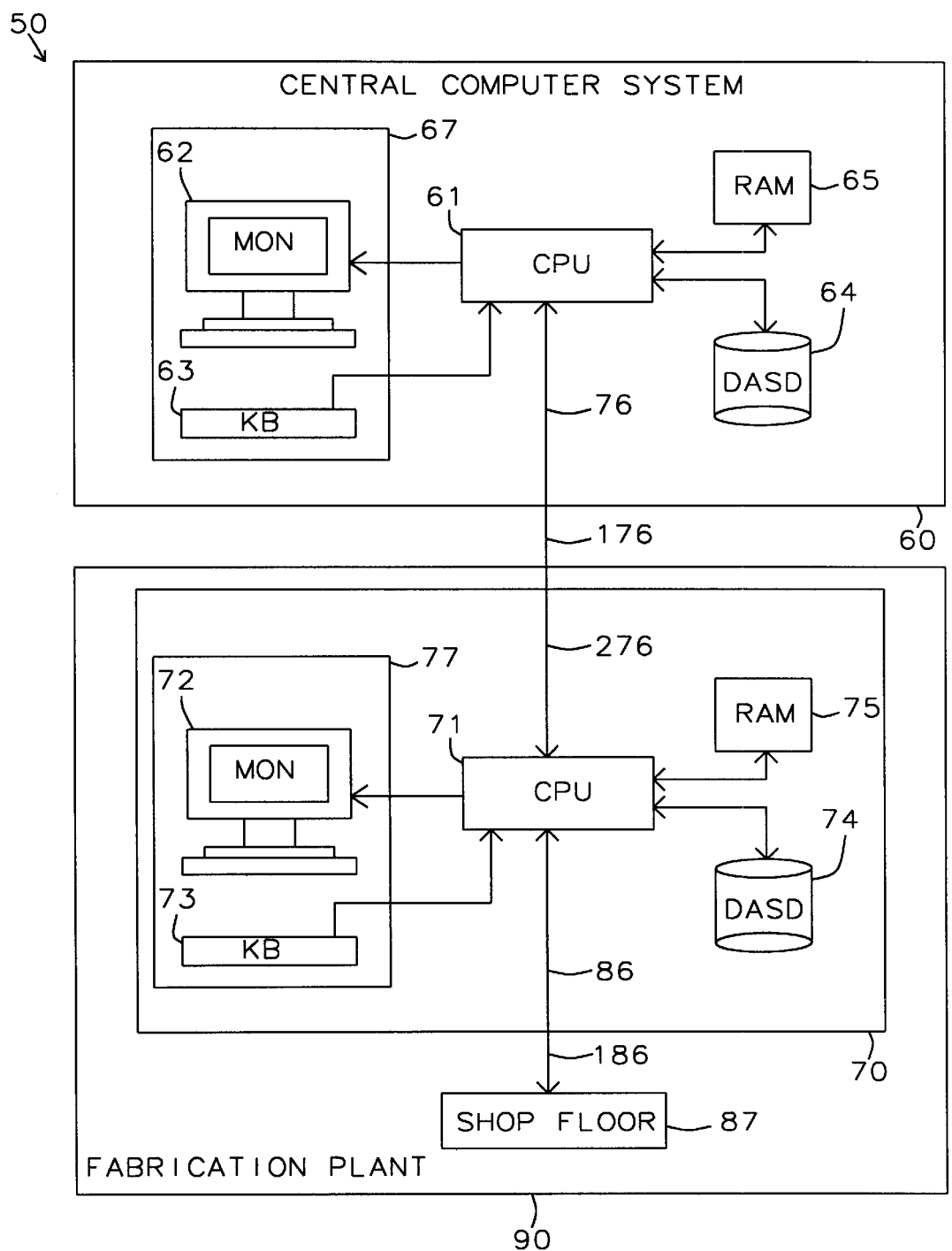
FIG. 3 shows a manufacturing plant which includes a central computer system and a fabrication plant with a shop floor where products, such as semiconductor chips, are being manufactured and a computer system for allocating fabrication plant resources in accordance with this invention.

FIG. 3 shows a manufacturing plant 50 which includes a central computer system 60 and a fabrication plant 90 with a shop floor 87 where products, such as semiconductor chips, are being manufactured and a computer system 70 for allocating fabrication plant resources in accordance with this invention.

The computer program of FIG. 2 in accordance with this invention is preferably resident in a site in the fabrication plant computer system 70 which is preferably connected, as shown in FIG. 3, as a part of the overall computer system with the central computer system 60, which is an alternative site for the computer program of FIG. 2.

Referring again to FIG. 3, the computer system 70 operates as an integral part of the fabrication plant 90 and so it is shown located within the plant 90, but it may be located elsewhere, as will be obvious to those skilled in the art and it can be a portion of an overall consolidated system incorporating the central computer system 60 and can operate independently as a matter of choice.

The central computer system 60 shown in FIG. 3 comprises a CPU (Central Processing Unit) 61, a terminal 67 with a monitor 62 and a keyboard 63 connected to the CPU 61 for receiving/sending data respectively from/to the CPU 61. A RAM (Random Access Memory) 65 and a DASD 64 associated with the CPU 61 are shown connected for bidirectional communication of data to and from CPU 61.

Lines 76, 176 and 276 provide for interconnections between the CPU 61 of system 60 to the CPU 71 of the fabrication plant computer system 70. Line 176 connects between lines 76 and 276 at the interfaces of computer 60 and a factory control computer system 70 respectively.

The factory control computer system 70 comprises a CPU 71, a terminal 77 with monitor 72 and keyboard 73 connected to the CPU 71 for receiving/sending data respectively from/to the CPU 71. A random access memory 75 and a DASD 74 associated with the CPU 71 are shown connected for bidirectional communication of data to and from CPU 71. Line 86 connects from CPU 71 to line 186 connects through the factory control computer 70 interface to the shop floor system 87.

The system 50 includes the data defining the Master Production Schedule (MPS) and the Key Stage Report (KSR) for the plant 90 stored in one of the DASD unit 64, DASD unit 74 RAM 65 or RAM 75, as desired, in a conventional manner, as will be well understood by those skilled in the art.

Process Steps

Referring again to FIG. 2, a flow chart shows the method of this invention of employing a data processing system to resolve the differences between the Key Stage Report (KSR) 20 and a Master Production Schedule (MPS) 31. The data processing system of FIG. 3 performs functions defined by the process control steps shown in FIG. 2.

As stated above, the method of this invention starts in step 40 when the system 50 in FIG. 3 initiates the steps of reading the Key Stage Report (KSR) 20 in step 41, simultaneously with the reading of the Master Production Schedule (MPS) 31 in step 42 from DASD unit 64, RAM 65, DASD unit 74, and/or RAM 75.

FIG. 4 is a chart showing a portion of a KSR (Key Stage Report) which is a report on the process flow of the fabrication plant (FAB). The KSR (Key Stage Report) 20 of FIGS. 1 and 4 is read by the program of FIG. 2 in step 41, is a report on the process flow of the fabrication plant (FAB). The KSR 20 includes the data for the processing tools on the shop floor 87 in FIG. 3 which include "Stage 1" 21, "Stage 2" 22, "Stage 3" 23, . . . and the "QC-insp stage" 27. Stage 27 performs Quality Control (QC) and inspection (insp). In the KSR in FIG. 1, the first wafer "W1" 24 is located for processing by "Stage 1" 21. The second wafer "W2" 25 is located for processing by "Stage 2" 22. The third wafer "W3" 26 is located for processing by "Stage 3" 23. The "QC-insp stage" 27 is the last stage on the floor of the FAB which is where wafers WA 28 (product A) and WB 29 (product B) are located.

| Definitions for KSR: |
|---|
| A = Product A |
| B = Product B |
| W1 = Wafer |
| W2 = Wafer |
| W3 = Wafer |
| WA = Wafer |
| WB = Wafer |
| S1a = Wafer Lot 1a |
| S2a = Wafer Lot 2a |
| S3a = Wafer Lot 3a |
| S4a = Wafer Lot 4a |
| S5a = Wafer Lot 5a |
| S1b = Wafer Lot 1b |
| S2b = Wafer Lot 2b |
| S3b = Wafer Lot 3b |
| S4b = Wafer Lot 4b |
| S5b = Wafer Lot 5b |

FIG. 5 is a chart showing a portion of a MPS (Master Production Schedule) which is a customer driven table reflecting the schedule demands of customers. The MPS (Master Production Schedule) 31 in FIGS. 1 and 5 is a table with block 33A for wafer lots S1$a$, S2$a$, S3$a$, S4$a$, and S5$a$, etc. for product A and with block 33B for wafer lots S1$b$, S2$b$, S3$b$, S4$b$, and S5$b$, etc. for product B, for the various dates including date1, date2, date3, date4, date5 . . . date31, as described below.

For product A the schedule for ordered lots in block 33A includes wafer lots S1$a$, S2$a$, S3$a$, S4$a$, and S5$a$ scheduled for the dates of date1, date2, date3, date4, and date5, respectively.

For product B the schedule for ordered lots in block 33B includes lots S1$b$, S2$b$, S3$b$, S4$b$, and S5$b$ scheduled for the dates of date1, date2, date3, date4, and date5, respectively.

The MPS table 31 in FIGS. 1 and 5 shows an example of the first five days of a monthly production schedule for products A and B. The MPS table, as shown, suggests the inclusion of data for a thirty-one (31) day month.

Generation of Master Production Schedule Report

FIG. 6 is a chart showing a portion of a MPSR (Master Production Schedule Report) which integrates the customer driven MPS table and the KSR.

In step 43 of FIG. 2, the system 70 generates a Master Production Schedule Report (MPSR) 35 in FIGS. 1 and 6 by integration of the KSR report from step 41 of FIG. 2 with the MPS report from step 42 of FIG. 2 following only the Due_Date in making the sequence determinations.

In accordance with this invention, the lots are fit into a sequence selected from the KSR (Key Stage Report) to meet the Master Production Schedule Report (MPSR) needs producing the MPSR 35 in FIGS. 1 and 6 As it turns out in this example, in report 35 in FIGS. 1 and 6, for product A in box 36, the lot S2$a$ at Date1 is first and the lot S4$a$ at Date5 is last. In the case of product B in box 37, the lot S4$b$ at Date1 is first and the lot S3$b$ at Date5 is last.

From report 35 line 38 leads to block 39 which includes as follows:

Date1,2 . . . ; Required Date; Date1,2 . . . ; Due_Date

Use Matrix to Integrate MPSR with Wafers
Quantity within Deliverable Cycle Time

In step 44 in FIG. 2, the system 70 obtains WIP quantity data.

In step 45, the system 70 generates an MPSR matrix seen in FIG. 7 to integrate the master production schedule report (MPSR) with the quantity of wafers from the WIP quantity data within deliverable Cycle Time (CTn where n is a positive integer). FIG. 7 shows an example of a Work in Process (WIP) MPSR matrix, as follows:

S2$a$1, S1$a$1, S4$a$1, S4$a$2 and S2$b$2 for wafer count CT1

S4$b$1, S2$a$2, S1$a$2, S1$b$1 and S2$b$1 for wafer count CT2

S4$b$2, S5$b$1, S5$b$2, S3$a$2 and S3$b$2 for wafer count CT3

S1$b$2, S3$b$1, S3$a$1, S5$a$1 and S5$a$2 for wafer count CT4

EQUATION $$\sum_{X=1,Y=1}^{X=n,Y=3} MPSR(\text{Due\_Date }(X), CT(Y)) = \text{Designed Out}$$

Cycle Time (CT)=Time to go from beginning to end of FAB

X=1, 2, 3 . . . m

Y=1, 2, 3 . . . p where m and p are positive integers.

Select Wafers from Above WIP Distribution by
Scanning the Matrix with Snake Patterns Referring to FIG. 8, in step 46 in FIG. 2, wafers are selected from the MPSR matrix shown in FIG. 7 by scanning adjacent columns of wafers with a pair of snake patterns illustrating a set of such patterns which is required to scan the entire matrix of FIG. 7. The first snake pattern P1 proceeds along an initial column in one direction but before completing a scan of the column jumps over to the adjacent column and scans a portion the second column as well. The second snake pattern scan P2 employed is complementary to the first snake pattern. Accordingly the pattern is different, but it is juxtaposed with the initial scan.

While the scans are shown to be juxtaposed, it is possible to interleave scans leaving gaps between scans.

A first snake pattern P1 goes down column 1 through the first three wafers and then goes up to the top of column 2 and processes the first three wafers in column 2 where it stops.

The second snake pattern P2 goes from the bottom of column 1 through the bottom of column 2 to the top of column 3 and processes the first three wafers in column 3.

The snake patterns P1 and P2 seen in FIG. 8 are examples and many other snake patterns can be used.

The use of a sequence of snake patterns continues until selection of all of the WIP in the manufacturing process is completed.

Change Due Dates of Selected Wafers

In step 47 of FIG. 2, the Due_Dates of the wafers selected in step 46 are changed in the mean time.

Provide Final Re-scheduling Table

In step 48 of FIG. 2, the final re-scheduling table of the New Master Production Schedule (NMPS) is provided as shown in FIG. 9 where the rescheduled "R" wafers replace the scheduled "S" wafers from the MPS of FIG. 5. Again the table suggests the inclusion of data for the use with a thirty-one (31) day month.

FIG. 9 shows the resultant New Master Production Schedule (NMPS) produced by the system and method of this invention with the new due_dates from step 47.

The resultant quantities will meet the Master Production Schedule (MPS) requirements, but lots from the Key Stage Report (KSR) will be different from the original values.

After step 48 the method of this invention ends in step 49.

As is stated above in step 43, use is made of the Due_Date.

In accordance with this invention use is made of the Due_Date, the link with products, and theoretical process time to make an exact re-scheduling automatically to ensure a linear wafer output.

This is a method for re-scheduling dynamically to define the Due_Date of a lot without changing the required date of the lot.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Below is found Table I which shows an example of a Key Stage Report.

TABLE I

KEY STAGE REPORT (KSR)

| Stage ID | Cur WIP | Held WIP | Run WIP | Cum WIP | Cur Move | Cur Target | BPTEOS | 0.6 WIP | Genus WIP | Single Metal | 0.6 SM | .8/1.0 WIP | DP WIP | SAC WIP | TM4457 | TM5334 | 0.6 TLM |
|---|---|---|---|---|---|---|---|---|---|---|---|---|---|---|---|---|---|
| WAF-START | 12 | 12 | 0 | 21994 | 1002 | 1000 | 12 | 12 | 12 | 0 | 0 | 0 | 0 | 0 | 0 | 0 | 0 |
| PAD-OX-1 | 72 | 48 | 0 | 21982 | 312 | 240 | | 72 | 24 | | | 72 | 0 | | | | |
| SIN-1-DEP | 96 | 0 | 96 | 21910 | 312 | 288 | | 96 | 96 | | | 96 | 0 | | | | |
| NWELL-PHO | 408 | 0 | 145 | 21814 | 750 | 860 | 288 | 192 | 288 | 24 | 24 | 216 | 0 | 120 | 0 | 0 | 0 |
| SIN-1-PHO | 0 | 0 | 0 | 21406 | 0 | 0 | | | 0 | | | 0 | | | | | |
| P-WL-1-PHO | 0 | 0 | 0 | 21406 | 0 | 0 | | | 0 | | | 0 | | | | | |
| SIN-1-ETCH | 48 | 0 | 0 | 21406 | 312 | 180 | | | 48 | 0 | | 48 | 0 | | | | |
| N-WL-1-IMP | 156 | 12 | 96 | 21358 | 606 | 320 | 12 | 84 | 156 | 96 | 72 | 72 | 0 | | 0 | 0 | 0 |
| P-WL-1-IMP | 0 | 0 | 0 | 21202 | 0 | 0 | | | 0 | | | 0 | | | | | |
| WELL-OX | 96 | 0 | 96 | 21202 | 144 | 240 | | | 96 | 24 | | 96 | 0 | | | | |
| SIN-1-RM | 120 | 0 | 120 | 21106 | 24 | 240 | | | 120 | 72 | | 120 | 0 | | | | |
| N-WL-2-IMP | 0 | 0 | 0 | 20986 | 324 | 188 | 0 | | 0 | | | 0 | 0 | 0 | | | |
| N-WL-DRIV | 168 | 0 | 120 | 20986 | 324 | 220 | 168 | | 0 | | | 168 | 0 | 168 | | | |
| PWELL-PHO | 0 | 0 | 0 | 20818 | 534 | 560 | 0 | 0 | 0 | 0 | | 0 | 0 | | 0 | 0 | 0 |
| P-WL-2-IMP | 48 | 0 | 0 | 20818 | 510 | 600 | 24 | 24 | 48 | 0 | 0 | 24 | 0 | | 0 | 0 | 24 |
| P-WL-DRIV | 0 | 0 | 0 | 20770 | 0 | 0 | | | 0 | 0 | 0 | 0 | 0 | | | | |
| WELL-DRIV | 456 | 0 | 420 | 20770 | 270 | 380 | 432 | 432 | 456 | 0 | 0 | 24 | 0 | | 0 | 0 | 300 |
| PAD-OX-2 | 222 | 0 | 126 | 20314 | 516 | 420 | 222 | 126 | 126 | 0 | 0 | 96 | 6 | 96 | 48 | 0 | 48 |
| SIN-2-DEP | 84 | 0 | 84 | 20092 | 672 | 550 | 84 | 0 | 0 | 0 | 0 | 84 | 0 | 84 | 0 | 0 | 0 |
| SIN-2-PHO | 253 | 58 | 15 | 20008 | 775 | 860 | 195 | 99 | 135 | 0 | 0 | 154 | 24 | 96 | 0 | 0 | 0 |
| SIN-2-ETCH | 179 | 0 | 0 | 19755 | 789 | 880 | 155 | 59 | 83 | 0 | 0 | 120 | 0 | 96 | 0 | 0 | 24 |
| N- FLD IMP | 96 | 0 | 48 | 19576 | 504 | 36 | 96 | | | | | 96 | | 96 | | | |
| P-FLD PHO | 120 | 0 | 72 | 19480 | 969 | 960 | 120 | 0 | 0 | 0 | 0 | 120 | 0 | 120 | 0 | 0 | 0 |
| P-FLD IMP | 24 | 0 | 0 | 19360 | 1088 | 920 | 24 | 0 | 0 | 0 | 0 | 24 | 0 | 24 | 0 | 0 | 0 |

TABLE I-continued

KEY STAGE REPORT (KSR)

| Stage ID | Cur WIP | Held WIP | Run WIP | Cum WIP | Cur Move | Cur Target | BPTEOS | 0.6 WIP | Genus WIP | Single Metal | 0.6 SM | .8/1.0 WIP | DP WIP | SAC WIP | TM4457 | TM5334 | 0.6 TLM |
|---|---|---|---|---|---|---|---|---|---|---|---|---|---|---|---|---|---|
| DEEP1-IMP | 188 | 0 | 48 | 19336 | 924 | 720 | 188 | 44 | 44 | 0 | 0 | 144 | 0 | 144 | 0 | 0 | 20 |
| DEEP-2-PHO | 0 | 0 | 0 | 19148 | 0 | 3 | 0 | | 0 | 0 | | | 0 | | | | |
| DEEP-2-IMP | 0 | 0 | 0 | 19148 | 0 | 3 | 0 | | 0 | 0 | | | 0 | | | | |
| FIELD-OX | 391 | 0 | 343 | 19148 | 1313 | 1100 | 343 | 151 | 175 | 24 | 24 | 240 | 24 | 216 | 0 | 0 | 48 |
| SIN-2-RM | 324 | 0 | 120 | 18757 | 989 | 920 | 204 | 276 | 324 | 72 | 72 | 48 | 24 | 0 | 0 | 0 | 168 |
| SAC-OX-1 | 24 | 0 | 0 | 18433 | 48 | 3 | 0 | 24 | 24 | 24 | 24 | | | 0 | | | |
| CHAN1-PHO | 0 | 0 | 0 | 18409 | 0 | 0 | 0 | 0 | | | | | | 0 | | | |
| CHAN1-IMP | 0 | 0 | 0 | 18409 | 0 | 0 | 0 | 0 | | | | | | 0 | | | |
| GATE-OX-1 | 48 | 0 | 0 | 18409 | 48 | 51 | 0 | 48 | 48 | 48 | 48 | | | 0 | | | |
| POLY-1-DEP | 0 | 0 | 0 | 18361 | 0 | 3 | 0 | 0 | 0 | 0 | | | | 0 | | | |
| SIN-3-DEP | 0 | 0 | 0 | 18361 | 48 | 27 | 0 | | 0 | 0 | | | | 0 | | | |
| BKPOLY1-RM | 0 | 0 | 0 | 18361 | 0 | 0 | 0 | 0 | | | | | | 0 | | | |
| POLY1-DOPE | 0 | 0 | 0 | 18361 | 0 | 0 | 0 | 0 | | | | | | 0 | | | |
| POLY-1-OX | 0 | 0 | 0 | 18361 | 0 | 0 | 0 | 0 | | | | | | 0 | | | |
| POLY-1-PHO | 48 | 0 | 0 | 18361 | 64 | 27 | 48 | 0 | 48 | 48 | | | | 48 | | | |
| PO-SN-ETCH | 42 | 0 | 0 | 18313 | 22 | 27 | 42 | | 42 | 42 | | | | 42 | | | |
| POLY-1-IMP | 0 | 0 | 0 | 18271 | 22 | 27 | 0 | | 0 | 0 | | | | 0 | | | |
| POLY1-ETCH | 0 | 0 | 0 | 18271 | 0 | 0 | 0 | 0 | | | | | | 0 | | | |
| BAR1-IMP | 0 | 0 | 0 | 18271 | 0 | 0 | 0 | 0 | | | | | | 0 | | | |
| CELL-1-IMP | 22 | 0 | 0 | 18271 | 0 | 27 | 22 | | 22 | 22 | | | | 22 | | | |
| CELL-2-IMP | 0 | 0 | 0 | 18249 | 0 | 27 | 0 | | 0 | 0 | | | | 0 | | | |
| SAC-OX-2 | 209 | 0 | 137 | 18249 | 828 | 782 | 161 | 161 | 209 | 0 | | 48 | 24 | 0 | 0 | 0 | 113 |
| VT1 P IMP0 | 0 | 0 | 0 | 18040 | 0 | 0 | | | | | | | 0 | | | | |
| POLY1--OX | 0 | 0 | 0 | 18040 | 2 | 27 | 0 | 0 | 0 | 0 | | | | 0 | | | |
| SIN-3-RM | 0 | 0 | 0 | 18040 | 2 | 27 | 0 | | 0 | 0 | | | 0 | 0 | | | |
| CA-N-PHO | 0 | 0 | 0 | 18040 | 0 | 0 | | | 0 | | | | 0 | | | | |
| PO-I-ETCH | 7 | 7 | 0 | 18040 | 0 | 8 | 7 | | 7 | 7 | | | | 7 | | | |
| CA-N-IMP | 0 | 0 | 0 | 18033 | 0 | 0 | | | 0 | | | | 0 | | | | |
| BR-S/D-PHO | 72 | 24 | 0 | 18033 | 144 | 172 | 0 | 72 | 72 | 72 | 72 | | | | | | |
| BR-S/D-IMP | 24 | 0 | 0 | 17961 | 120 | 168 | 0 | 24 | 24 | 24 | 24 | | | | | | |
| CPT-PHO | 24 | 0 | 0 | 17937 | 144 | 140 | 0 | 24 | 24 | 24 | 24 | | | | | | |
| CPT-IMP | 120 | 0 | 72 | 17913 | 48 | 96 | 0 | 120 | 120 | 120 | 120 | | | | | | |
| XX-PHO | 82 | 0 | 45 | 17793 | 110 | 180 | 64 | 64 | 76 | 18 | | 18 | 64 | | | | |
| XX-N-IMP | 63 | 0 | 0 | 17711 | 35 | 120 | 51 | 51 | 63 | 12 | | 12 | 51 | | | | |
| VT1 P IMP1 | 228 | 0 | 72 | 17648 | 743 | 780 | 96 | 96 | 168 | 0 | 0 | 132 | 72 | | 0 | 0 | 0 |
| VT1--PHO | 0 | 0 | 0 | 17420 | 288 | 220 | 0 | | | | | 0 | | 0 | | | |

Below is found Table II which shows an example of a Master Production Schedule.

TABLE II

MASTER PRODUCTION SCHEDULE (MPS)
Date1, 2 . . . : Required Date; Date1, 2 . . . Due Date
SUBJECT: FAB-2A OUTPUT SCHEDULED VS. ACTUAL WEEKLY PERFORMANCE FOR - AUGUST 1997

| PROD RUN*** | | | | | SCHEDULE | | | | | ACTUAL | | | | | PERFORMANCE | | | | MTD | |
|---|---|---|---|---|---|---|---|---|---|---|---|---|---|---|---|---|---|---|---|---|
| DEVICE | MPS | C/P | PKG # | ESTI | 01-07 WK732 | 08-14 WK133 | 15-21 WK734 | 22-31 WK735 | MTD TOTAL | 01-07 WK732 | 08-14 WK733 | 15-21 WK734 | 22-31 WK735 | MTD TOTAL | 01-07 WK732 | 08-14 WK733 | 15-21 WK734 | MTD TOTAL | DELAY Q'TY |
| TM1294 | 216 | | | 216 | 48 | 72 | 0 | 96 | 216 | 72 | 24 | 0 | 0 | 96 | 150% | 80% | 80% | 44% | 120 |
| TM4635 | 24 | | | 24 | 0 | 0 | 24 | 0 | 24 | 0 | 0 | 0 | 0 | 0 | | | 0% | 0% | 24 |
| TM3779 | 12 | | | 12 | 0 | 0 | 12 | 0 | 12 | 0 | 0 | 0 | 6 | 6 | | | 50% | 50% | 6 |
| TM4142 | 24 | | | 24 | 0 | 0 | 12 | 12 | 24 | 6 | 0 | 0 | 0 | 6 | | | 50% | 25% | 18 |
| TM4352 | 9 | | | 9 | 0 | 0 | 9 | 0 | 9 | 0 | 0 | 8 | 0 | 8 | | | 89% | 89% | 1 |
| TM5672 | 12 | | | 12 | 0 | 0 | 12 | 0 | 12 | 0 | 6 | 0 | 0 | 6 | | | 50% | 50% | 6 |
| TM5607 | 6 | | | 6 | 0 | 0 | 6 | 0 | 6 | 0 | 3 | 0 | 0 | 3 | | | 50% | 50% | 3 |
| TM1428 | 48 | | | 48 | 0 | 0 | 0 | 48 | 48 | 0 | 0 | 0 | 0 | 0 | | | | 0% | 48 |
| TM0975 | 24 | | | 24 | 0 | 0 | 0 | 24 | 24 | 0 | 0 | 0 | 0 | 0 | | | | 0% | 24 |
| TM1175 | 240 | | | 240 | 72 | 0 | 0 | 168 | 240 | 72 | 0 | 0 | 71 | 143 | 100% | 100% | | 60% | 97 |
| TM0794 | 12 | * | | 12 | 0 | 0 | 0 | 12 | 12 | 0 | 0 | 0 | 0 | 0 | | | | 0% | 12 |
| TM1977 | 168 | * | | 168 | 0 | 0 | 0 | 168 | 168 | 0 | 0 | 144 | 0 | 144 | | | 86% | 86% | 24 |
| TM2290 | 36 | | | 36 | 0 | 0 | 0 | 36 | 36 | 0 | 0 | 24 | 0 | 24 | | | | 67% | 12 |
| TM2461 | 24 | | | 24 | 0 | 0 | 0 | 24 | 24 | 0 | 0 | 0 | 0 | 0 | | | | 0% | 24 |
| TM5609 | 6 | | | 6 | 0 | 6 | 0 | 0 | 6 | 0 | 5 | 0 | 0 | 5 | | 83% | | 83% | 1 |
| TM4849 | 456 | | | 456 | 0 | 0 | 0 | 456 | 456 | 0 | 0 | 0 | 354 | 354 | | | | 78% | 102 |
| TM4940 | 600 | | | 600 | 0 | 0 | 336 | 264 | 600 | 0 | 0 | 310 | 95 | 405 | | | 92% | 68% | 195 |
| TM3306 | 120 | | | 120 | 0 | 0 | 120 | 0 | 120 | 0 | 0 | 70 | 2 | 72 | | | 58% | 60% | 48 |
| TM3023 | 36 | | | 36 | 0 | 0 | 0 | 36 | 36 | 0 | 0 | 0 | 24 | 24 | | | | 67% | 12 |
| TM4075 | 2153 | * | # | 2153 | 357 | 728 | 456 | 612 | 2153 | 260 | 871 | 237 | 473 | 1841 | 73% | 104% | 89% | 86% | 312 |
| TM2669 | 30 | | # | 30 | 0 | 0 | 12 | 18 | 30 | 0 | 0 | 0 | 18 | 18 | | | 0% | 60% | 12 |
| TM5678 | 6 | | | 6 | 0 | 0 | 0 | 6 | 6 | 0 | 3 | 0 | 0 | 3 | | | | 50% | 3 |
| TM5654 | 12 | | | 12 | 0 | 12 | 0 | 0 | 12 | 0 | 6 | 0 | 0 | 6 | | 50% | 50% | 50% | 6 |
| TM5683 | 12 | | | 12 | 0 | 0 | 12 | 0 | 12 | 0 | 0 | 0 | 4 | 4 | | | 0% | 33% | 8 |
| TM3546 | 144 | * | # | 144 | 0 | 0 | 24 | 120 | 144 | 0 | 0 | 8 | 24 | 32 | | | 33% | 22% | 112 |
| TM4379 | 48 | | | 48 | 24 | 0 | 0 | 24 | 48 | 24 | 0 | 0 | 0 | 24 | 100% | | 100% | 50% | 24 |
| TM1932 | 158 | * | # | 158 | 0 | 62 | 0 | 96 | 158 | 59 | 2 | 0 | 79 | 140 | | 98% | 98% | 89% | 18 |
| TM5676 | 12 | | | 12 | 0 | 0 | 12 | 0 | 12 | 0 | 6 | 0 | 0 | 6 | | | 50% | 50% | 6 |
| TM5682 | 12 | | | 12 | 0 | 0 | 12 | 0 | 12 | 0 | 6 | 0 | 0 | 6 | | | 50% | 50% | 6 |
| TM2403 | 91 | | | 91 | 0 | 19 | 0 | 72 | 91 | 0 | 19 | 0 | 0 | 19 | | 100% | | 21% | 72 |
| TM3429 | 72 | | | 72 | 0 | 0 | 0 | 72 | 72 | 0 | 0 | 0 | 0 | 0 | | | | 0% | 72 |
| TM4375 | 96 | | | 96 | 0 | 48 | 0 | 48 | 96 | 0 | 42 | 0 | 0 | 42 | | 88% | 88% | 44% | 54 |
| TM4634 | 406 | | | 406 | 142 | 96 | 0 | 168 | 406 | 118 | 120 | 0 | 24 | 262 | 83% | 100% | 100% | 65% | 144 |
| TM2691 | 404 | | | 404 | 308 | 96 | 0 | 0 | 404 | 334 | 24 | 0 | 0 | 358 | 108% | 89% | 89% | 89% | 46 |
| TM2726 | 120 | | | 120 | 0 | 0 | 120 | 0 | 120 | 0 | 0 | 0 | 99 | 99 | | | 0% | 83% | 21 |
| TM2737 | 2831 | | | 2831 | 359 | 792 | 816 | 864 | 2831 | 359 | 310 | 574 | 906 | 2149 | 100% | 58% | 63% | 76% | 682 |
| TM2746 | 288 | | | 288 | 72 | 0 | 0 | 216 | 288 | 72 | 0 | 0 | 115 | 187 | 100% | 100% | 100% | 65% | 101 |
| TM3161 | 24 | | | 24 | 0 | 0 | 0 | 24 | 24 | 0 | 0 | 0 | 0 | 0 | | | | 0% | 24 |

TABLE II-continued

MASTER PRODUCTION SCHEDULE (MPS)
Date1, 2 . . . : Required Date; Date1, 2 . . . Due Date
SUBJECT: FAB-2A OUTPUT SCHEDULED VS. ACTUAL WEEKLY PERFORMANCE FOR - AUGUST 1997

| PROD RUN*** | | | | | SCHEDULE | | | | | | ACTUAL | | | | | PERFORMANCE | | | | MTD |
|---|---|---|---|---|---|---|---|---|---|---|---|---|---|---|---|---|---|---|---|---|
| DEVICE | MPS | C/P * | PKG # | ESTI | 01–07 WK732 | 08–14 WK133 | 15–21 WK734 | 22–31 WK735 | MTD TOTAL | 01–07 WK732 | 08–14 WK733 | 15–21 WK734 | 22–31 WK735 | MTD TOTAL | 01–07 WK732 | 08–14 WK733 | 15–21 WK734 | MTD TOTAL | DELAY Q'TY |
| TM3162 | 335 | * | | 335 | 0 | 167 | 48 | 120 | 335 | 0 | 41 | 72 | 40 | 153 | | 25% | 53% | 46% | 182 |
| TM2913 | 264 | * | | 264 | 0 | 48 | 48 | 168 | 264 | 24 | 24 | 24 | 159 | 231 | 91% | 100% | 75% | 88% | 33 |
| TM3292 | 1054 | * | | 1054 | 286 | 192 | 240 | 336 | 1054 | 259 | 190 | 169 | 299 | 917 | 91% | 94% | 86% | 87% | 137 |
| TM3810 | 167 | | | 167 | 47 | 0 | 96 | 24 | 167 | 23 | 24 | 72 | 24 | 143 | 49% | 100% | 83% | 86% | 24 |
| TM4243 | 216 | | | 216 | 24 | 24 | 0 | 168 | 216 | 48 | 120 | 0 | −24 | 192 | 200% | 350% | 350% | 89% | 24 |
| TM4294 | 48 | | | 48 | 0 | 0 | 0 | 48 | 48 | 0 | 0 | 0 | 0 | 0 | | | | 0% | 48 |
| TM5017 | 36 | | | 36 | 6 | 0 | 30 | 0 | 36 | 6 | 6 | 0 | 0 | 12 | 100% | 200% | 33% | 33% | 24 |
| TM5046 | 105 | | | 105 | 9 | 0 | 0 | 96 | 105 | 9 | 0 | 21 | 50 | 80 | 100% | 100% | 333% | 76% | 25 |
| TM5095 | 72 | | | 72 | 0 | 0 | 0 | 72 | 72 | 0 | 0 | 0 | 0 | 0 | | | | 0% | 72 |
| TM5106 | 72 | | | 72 | 0 | 0 | 0 | 72 | 72 | 0 | 6 | 5 | 0 | 11 | | 25% | 25% | 15% | 61 |
| TM5679 | 16 | | | 16 | 0 | 16 | 0 | 0 | 16 | 0 | 4 | 0 | 0 | 4 | | 25% | | 25% | 12 |
| TM2665 | 96 | * | | 96 | 0 | 0 | 24 | 72 | 96 | 0 | 24 | 0 | 0 | 24 | | 100% | 100% | 25% | 72 |
| TM4613 | 156 | | | 156 | 0 | 156 | 0 | 0 | 156 | 0 | 120 | 3 | 0 | 123 | | 77% | 79% | 79% | 33 |
| TM4615 | 240 | | | 240 | 168 | 72 | 0 | 0 | 240 | 120 | 71 | 0 | 0 | 191 | 71% | 80% | 80% | 80% | 49 |
| TM4655 | 6 | | | 6 | 6 | 0 | 0 | 0 | 6 | 3 | 0 | 0 | 0 | 3 | 50% | 50% | 50% | 50% | 3 |
| TM2514 | 120 | * | | 120 | 120 | 0 | 0 | 0 | 120 | 71 | 0 | 0 | 0 | 71 | 59% | 59% | 59% | 59% | 49 |
| ENG | 200 | | | 200 | 0 | 50 | 0 | 150 | 200 | 42 | 17 | 8 | 85 | 152 | 102% | 118% | 134% | 76% | 48 |
| TOTAL | 42000 | | | 42000 | 9826 | 9171 | 9614 | 13389 | 42000 | 10008 | 9063 | 9790 | 13188 | 42049 | 100% | 100% | 101% | 100% | 192 |
| IN TIME OUTPUT PERFORMANCE | | | | | | | | | 42000 | | | | 37808 | | | | | 90% | |

Having thus described the invention, what is claimed as new and desirable to be secured by Letters Patent is as follows:

1. A method for performing dynamic re-scheduling of priorities of work-in-process in a fabrication plant for manufacturing of a product comprising:

reading a key stage report for said work-in-process and a master production schedule for said work-in-process from stored data, generating a master production schedule report from said key stage report and said master production schedule following only Due_Date data for said work-in-process, generating a work-in-process distribution matrix for integrating said master production schedule report with work-in-process quantity data within a deliverable cycle time, allocating selected lots from said work-in-process distribution matrix using a snake pattern method to allocate said selected lots from said matrix, change the due date for said selected lots of said work-in-process selected by said snake pattern method, and generating a final re-scheduling table for said work-in-process including said selected lots.

2. A method in accordance with claim 1 including:
using said Due_Date data in allocating said selected lots.

3. A method in accordance with claim 1 including:
using a link with products in allocating said selected lots.

4. A method in accordance with claim 1 including:
using theoretical process time to make an exact re-scheduling automatically to ensure linear wafer output performance in allocating said selected lots.

5. A method in accordance with claim 1 including:
when forming said master production schedule fitting work-in-process in said key stage report to meet requirements of said master production schedule.

6. A method in accordance with claim 1 including:
using said Due_Date data in allocating said selected lots,
using a link with products in allocating said selected lots,
using theoretical process time to make an exact re-scheduling automatically to ensure linear wafer output performance in allocating said selected lots, and
fitting work-in-process in said key stage report to meet requirements of said master production schedule when forming said master production schedule.

7. A method in accordance with claim 1 including determining:

$$\sum_{X=1,Y=1}^{X=n,Y=3} MPSR(\text{Due\_Date}\,(X), CT(Y)) = \text{Designed Out}$$

CT=Cycle Time
X=1, 2, 3 . . . m
Y=1, 2, 3 . . . p
where m and p are positive integers and MPSR=Master Production Schedule Report.

8. A method in accordance with claim 7 including:
using the Due_Date in allocating said selected lots.

9. A method in accordance with claim 7 including:
using a link with products in allocating said selected lots.

10. A method in accordance with claim 7 including:
using theoretical process time to make an exact re-scheduling automatically to ensure linear wafer output performance in allocating said selected lots.

11. A method in accordance with claim 7 including:
fitting work-in-process in said key stage report to meet requirements of said master production schedule when forming said master production schedule.

12. A method for performing dynamic re-scheduling of priorities of work-in-process in a fabrication plant for manufacturing of a product comprising:

reading a key stage report for said work-in-process and a master production schedule for said work-in-process from stored data, generating a master production schedule report from said key stage report and said master production schedule following only Due_Date data for said work-in-process, generating a work-in-process distribution matrix for integrating said master production schedule report with work-in-process quantity data within a deliverable cycle time, allocating selected lots from said work-in-process distribution matrix using a snake pattern method to allocate said selected lots from said matrix, changing the due date for said selected lots of said work-in-process selected by said snake pattern method, and generating a final re-scheduling table for said work-in-process including said selected lots, where $$\sum_{X=1,Y=1}^{X=n,Y=3} MPSR(\text{Due\_Date}\,(X), CT(Y)) = \text{Designed Out}$$

CT=Cycle Time
X=1, 2, 3 . . . m
Y=1, 2, 3 . . . p
where m and p are positive integers and MPSR=Master Production Schedule Report, using said Due_Date data in allocating said selected lots,
using a link with products in allocating said selected lots,
using theoretical process time to make an exact re-scheduling automatically to ensure linear wafer output performance in allocating said selected lots, and
fitting work-in-process in said key stage report to meet requirements of said master production schedule when forming said master production schedule.

13. A system for performing dynamic re-scheduling of priorities of work-in-process (WIP) in a fabrication plant for manufacturing of a product comprising:

key stage report means for performing the step of reading a key stage report for said work-in-process and a master production schedule (MPS) for said work-in-process from stored data, MPS schedule report means for performing the step of generating a master production schedule report from said key stage report and said master production schedule following only Due_Date data for said work-in-process, WIP distribution matrix means for performing the step of generating a work-in-process distribution matrix for integrating said master production schedule report with work-in-process quantity data within a deliverable cycle time, allocation means for performing the step of allocating selected lots from said work-in-process distribution matrix using a snake pattern method to allocate said selected lots from said matrix, rescheduling means for performing the step of changing the due date for said selected lots of said work-in-process selected by said snake pattern method, and re-scheduling table means for performing the step of generating a final re-scheduling table for said work-in-process including said selected lots.

14. A system in accordance with claim 13 including Due_Date data means for performing the step of using said Due_Date data in allocating said selected lots.

15. A system in accordance with claim 13 including link means for performing the step of using a link with products in allocating said selected lots.

16. A system in accordance with claim 13 including theoretical process time means for performing the step of using theoretical process time to make an exact re-scheduling automatically to ensure linear wafer output performance in allocating said selected lots.

17. A system in accordance with claim 13 including fitting means for performing the step of fitting work-in-process in said key stage report to meet requirements of said master production schedule when forming said master production schedule.

18. A system in accordance with claim 13 including:

Due_Date data means for performing the step of using said Due_Date data in allocating said selected lots, link means for performing the step of using a link with products in allocating said selected lots, theoretical process time means for performing the step of using theoretical process time to make an exact re-scheduling automatically to ensure linear wafer output performance in allocating said selected lots, and fitting means for performing the step of fitting work-in-process in said key stage report to meet requirements of said master production schedule when forming said master production schedule.

19. A system in accordance with claim 13 including means for performing the step of determining:

$$\sum_{X=1,Y=1}^{X=n,Y=3} MPSR(\text{Due\_Date}(X), CT(Y)) = \text{Designed Out}$$

$CT$ = Cycle Time $X = 1, 2, 3 \dots m$ $Y = 1, 2, 3 \dots p$ where m and p are positive integers and MPSR=Master Production Schedule Report.

20. A system in accordance with claim 19 including Due_Date means for performing the step of using the Due_Date in allocating said selected lots.

21. A system in accordance with claim 19 including link means for performing the step of using a link with products in allocating said selected lots.

22. A system in accordance with claim 19 including theoretical process time means for performing the step of using theoretical process time to make an exact re-scheduling automatically to ensure linear wafer output performance in allocating said selected lots.

23. A system in accordance with claim 19 including fitting means for performing the step of fitting work-in-process in said key stage report to meet requirements of said master production schedule when forming said master production schedule.

24. A system for performing dynamic re-scheduling of priorities of work-in-process in a fabrication plant for manufacturing of a product comprising:

reading means for performing the step of reading a key stage report for said work-in-process and a master production schedule (MPS) for said work-in-process from stored data, MPS report means for performing the step of generating a master production schedule report from said key stage report and said master production schedule following only Due_Date data for said work-in-process, matrix means for performing the step of generating a work-in-process distribution matrix for integrating said master production schedule report with work-in-process quantity data within a deliverable cycle time, allocation means for performing the step of allocating selected lots from said work-in-process distribution matrix using a snake pattern method to allocate said selected lots from said matrix, change means for performing the step of changing the due date for said selected lots of said work-in-process selected by said snake pattern method, and re-scheduling means for performing the step of generating a final re-scheduling table for said work-in-process including said selected lots, where $$\sum_{X=1,Y=1}^{X=n,Y=3} MPSR(\text{Due\_Date}(X), CT(Y)) = \text{Designed Out}$$

$CT$ = Cycle Time $X = 1, 2, 3 \dots m$ $Y = 1, 2, 3 \dots p$ where m and p are positive integers and MPSR=Master Production Schedule Report.

Due_Date data means for performing the step of using said Due_Date data in allocating said selected lots, link means for performing the step of using a link with products in allocating said selected lots, theoretical process time means for performing the step of using theoretical process time to make an exact re-scheduling automatically to ensure linear wafer output performance in allocating said selected lots, and fitting means for performing the step of fitting work-in-process in said key stage report to meet requirements of said master production schedule when forming said revised master production schedule.

* * * * *